J. E. L. BLACKMORE.
GEAR CUTTING MACHINE.
APPLICATION FILED OCT. 12, 1916.

1,376,600.

Patented May 3, 1921.
5 SHEETS—SHEET 1.

Witness:
C. H. Blackmore

Inventor:
J. E. Lloyd Blackmore

J. E. L. BLACKMORE.
GEAR CUTTING MACHINE.
APPLICATION FILED OCT. 12, 1916.

1,376,600.

Patented May 3, 1921.
5 SHEETS—SHEET 3.

Witness:
C. H. Blackmore.

Inventor:
J. E. Lloyd Blackmore.

J. E. L. BLACKMORE.
GEAR CUTTING MACHINE.
APPLICATION FILED OCT. 12, 1916.

1,376,600.

Patented May 3, 1921.
5 SHEETS—SHEET 5.

Witness:
C. H. Blackmore

Inventor:
J. E. Lloyd Blackmore

UNITED STATES PATENT OFFICE.

JOHN ERVIN LLOYD BLACKMORE, OF DETROIT, MICHIGAN, ASSIGNOR TO GLEASON WORKS, OF ROCHESTER, NEW YORK, A CORPORATION OF NEW YORK.

GEAR-CUTTING MACHINE.

1,376,600. Specification of Letters Patent. Patented May 3, 1921.

Application filed October 12, 1916. Serial No. 125,328.

*To all whom it may concern:*

Be it known that I, JOHN ERVIN LLOYD BLACKMORE, a subject of the King of Great Britain, residing at the city of Detroit, in the county of Wayne and State of Michigan, in the United States of America, have invented certain new and useful Improvements in Gear-Cutting Machines, of which the following is a specification.

This invention relates to gear cutting machines and, more particularly, to machines for making gears commercially known as "helical" or "spiral" gears having teeth curved in the direction of their length and also the bevel forms of such gears and in the following specification where gears are referred to or mentioned it must be understood that spiral or helical bevel gears are meant unless otherwise particularly mentioned.

It is now well known in the state of the art to cut bevel gears by the process of evolution, that is generating the individual teeth of the gear by moving the blank, from which the gear is to be cut, in relation to a cutting member with a rolling motion, and machines for this purpose have been developed whereby it is commercial practice to use this principal in the cutting of the "helical" or "spiral" type of bevel gears herein referred to. These machines have employed a reciprocatory type of cutter and also a "sunflower" or "facemill" type of cutter the latter being a revolving disk element having cutting members extending from one side face thereof adjacent the periphery. In all such machines however the cutter operates on but one tooth of the gear being cut at a time until the said tooth is completely generated, at least in the rough, following which it has been the universal custom to move the cutting element and the gear blank apart until the gear blank is indexed to proper position to commence the cutting and the generating of the next or another tooth.

It is also known to use a cutter of the face mill type having the teeth thereof arranged in a spiral and rotating to operate in a continuous manner about the gear blank but the spiral presents a series of teeth having different radii and cutting on different curves through the blank whereby mechanical objections are encountered and such cutters are therefore only used for roughing out blanks.

In the present invention the gear blank and the cutting element, which latter has teeth of uniform radius, are rotated coincidently and continuously during the cutting of the entire gear, the several teeth of the gear being started consecutively and the gear blank being moved with a rolling motion in relation to the cutting element whereby all the teeth are of regular form and generated with the one relative rolling movement of the gear blank and a gear with novel form of teeth is the result.

The chief object of the invention is to provide a practical and efficient machine of the above character having fully and conveniently adjustable parts adapting it to handle gear blanks of various sizes and dimensions and capable of accurately and rapidly producing finished gears.

Further objects of the invention will be evident from the following description taken in connection with the drawings which form a part hereof, and in which.

In the drawings like numerals of reference indicate the same parts in the several figures.

Referring to the drawings and particularly Figs. 1, 2, 3 and 4, a gear 200 and a mating pinion 201 are shown having the novel form of teeth as herein referred to though it must be understood throughout the present specification that the exact form, angle, curve, or direction of teeth on the respective gears and pinions as shown is not arbitrary and may be modified in scope to meet the various requirements for gears having different purposes.

Figures 1, 2, 3:
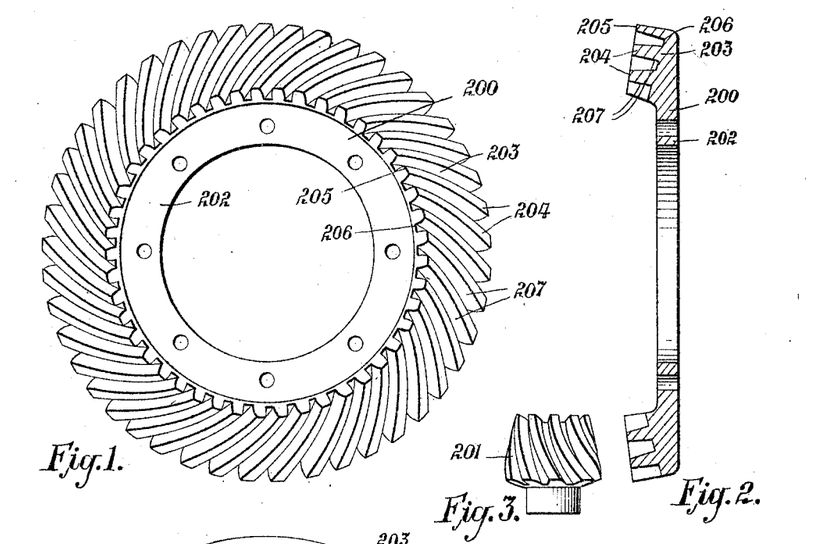
Figure 1 is an enlarged plan view of the gear.
Fig. 2 is an enlarged sectional view of the gear.
Fig. 3 is an enlarged side elevation of a pinion having the teeth thereof adapted to mate with the gear shown in Figs 1 and 2.

The gear 200 is formed from a blank having a web portion 202 and a tooth portion 203 having several teeth 204 formed therein with their addendum and dedendum surfaces 205 and 206 respectively forming cone frustums with a common apex and their side faces 207 curved in relation to their length on elliptic lines conjugate to those described by a point passing through a circular arc and over the revolving plane surface of a zone.

Figure 4:
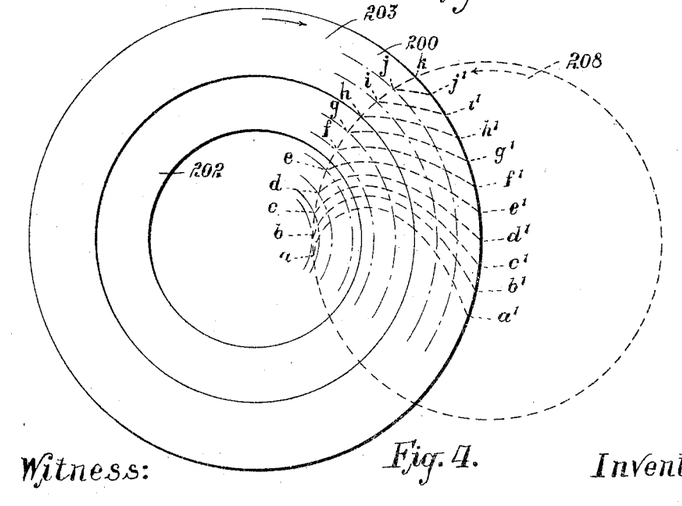
Fig. 4 is a diagrammatic view of the gear in Figs. 1 and 2 showing the path of the cutting element and consequent curve of the gear teeth.

The curve described is shown diagrammatically in Fig. 4 wherein 200 is the gear blank and 208 the cutter having a plurality of points $a$ to $k$ inclusive which have described lines $a$—$a'$, $b$—$b'$, $c$—$c'$, etc., over the surface of the gear, and as shown by the line $a$—$a'$ the curve is both to the right and to the left of the center of the gear and any part or the whole of such curve may be included in the teeth formed in the gear though it is considered commercially advantageous in consideration of the necessary shape of the cutting member to have only that part of the curve as indicated approximately by the line $h$—$h'$ to form the curve of the teeth.

The angle of spiral in a pair of gears should be such that the angular advance corresponding to the face length of the gear is greater than the circular pitch to always secure pitch line contact at some part of the teeth as this minimizes the wear of the teeth, such curving of the teeth also has the advantage of changing the end thrust to that of straight tooth bevel gears and being in accordance with the direction of curve and rotation.

When rotating the pinion of a pair of gears in the direction of the curve inwardly on the gear, the pinion thrust may be entirely offset due to the tendency of the pinion to pull in toward the gear but on reversal the same factor will augment the ordinary thrust. It is therefore evident that teeth curved in both directions might negative such thrust regardless of the direction of rotation and gears have been made for this purpose but the machining of the same is almost prohibitive in expense.

In the present invention if the teeth of the gears were cut along the entire line $a$—$a'$ Fig. 4, the objects of teeth curved in both directions would be attained and so in using any part of the particularly formed curves as herein described progress is made toward such attainment and an approach toward the negation of end thrust on the gears obtained.

The advantages set forth in the foregoing are attained by an improved and advantageous method of cutting the gears as particularly shown in Figs. 5 to 12 inclusive wherein the operations are diagrammatically illustrated.

Figure 5:
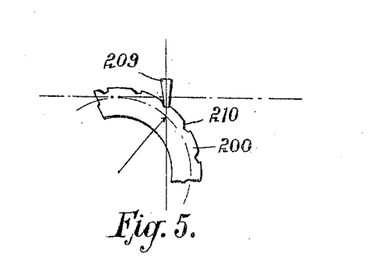
Fig. 5 is a diagrammatic view showing the method of cutting the gear when starting the generation of one side face of the teeth.
Figure 6:
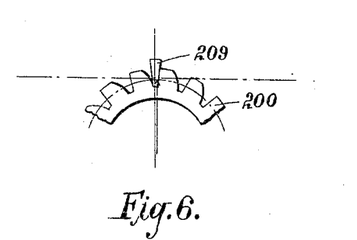
Fig. 6 is a diagrammatic view showing the method of cutting the gear when one side face of the teeth has been generated.

The curved lines of the teeth as fully shown in Fig. 4 permit of the cutting of all the teeth on the gear in gradual successive steps that is all the teeth are started on one side as shown in Fig. 5 wherein the section of the blank 200 has been started on the roll past a cutter member 209 and the generating of the teeth started on one side as at 210, each tooth about the entire gear having the same depth of cut and as the generating action is continued each tooth is fully formed on one side face as shown in Fig. 6 the cutting member being slightly to one side of the gear center whereby the curves of the sides of the teeth cut will vanish in proper relation to the pitch center of the gear and all the curves be regular in regard to one another.

Figure 7:
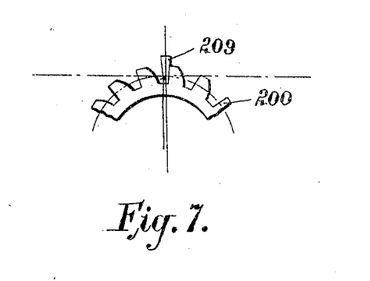
Fig. 7 is a diagrammatic view showing the method of cutting the gear across the dedendum of the teeth.
Figure 8:
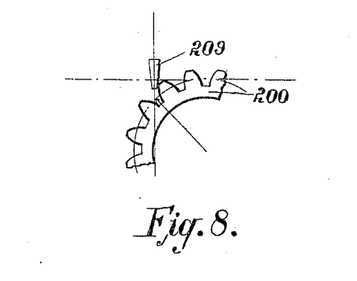
Fig. 8 is the diagrammatic view showing the method of cutting the gear while finishing the generation of the teeth.

The cutter is then shifted to the other side as shown in Fig. 7 to complete the addendum cut of the teeth and finally the opposite sides are generated as shown in Fig. 8.

The coincident cutting of all the teeth is made possible by the peculiar curve as the cutter teeth are arranged to contact with the gear blank at successive points about the periphery thereof. That is, reverting to Fig. 4 the cutter tooth at the point $a$ on the cutter 208 would pass through the tooth face of the blank on the line $a$—$a'$ and the cutter tooth at the point $b$ would pass on the line $b$—$b'$ etc., the one at $k$ being in the position of starting a new cut this being due to the coincident rotation of both the cutter and the gear blank as shown by the arrows.

Figures 9, 10, 11:
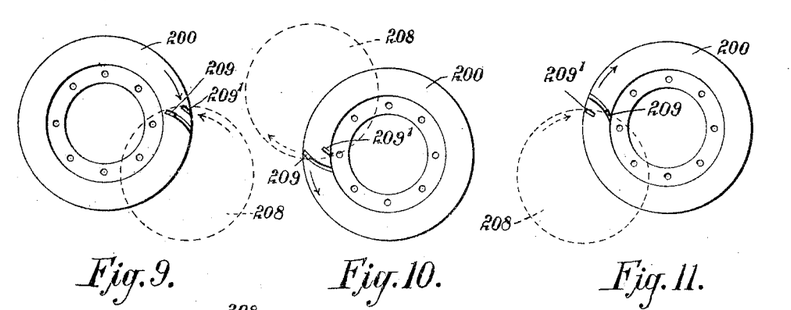
Figs. 9—10—11—12 are diagrammatic views showing possible operative positions of the gear blank and cutter.

In Fig. 9 the cutter 208 is shown in dotted lines positioned with the teeth 209 and 209' cutting in the direction of the arrow and against the comparatively equal rotation of the gear blank 200 in the opposite direction whereby the cutter tooth 209 has cut one gear tooth space and the cutter tooth 209' has entered upon the path to cut the next tooth space and the change in positions and the directions of the rotation of both the cutter and gear blank as shown in Figs. 10 and 11 will be understood as illustrative of a few of the many positions and directions of rotation which may be made in accordance with the invention.

Figure 12:
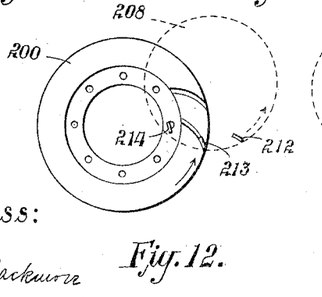

In Fig. 12 a tooth 212 of the cutter has passed through the tooth space on the gear blank, the cutter tooth 213 is shown just finishing a cut and the cutter tooth 214 some distance away whereby the blank may be rotated over the space of two or more teeth between cuts and after one complete revolution of the blank the same will be so indexed for teeth that the cutter will take into the proper uncut spaces to form the uncompleted teeth, though such procedure is obviously slower than the method hereinbefore explained.

Figure 13:
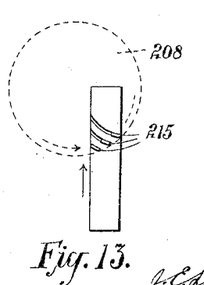
Fig. 13 is a diagrammatic view of a relative position of a cutter operating on a spur type of gear.

In Fig. 13 one position of the cutter with reference to a spur gear is shown and the action of cutting the curved teeth 215 will readily be understood from the foregoing and further the several explanations as given will apply to pinions as well as gears the only difference being in the size and angle of generating roll.

In Figs. 14 to 17 inclusive the preferred form of cutter for carrying out the objects of the invention is shown in detail in the form of a face mill and comprises a disk 99 having cutting teeth 100 secured at regular intervals about the periphery thereof, the said teeth being formed with round shanks 101 slotted at 102 and fitting corresponding orifices 103 at regular intervals around the disk 99 and adjacent to the periphery thereof. The disk 99 is slotted at 106 around the entire periphery inwardly past the orifices 103 and screws 98 are inserted through plain orifices in one side of the disk into the threaded orifices 105 on the other side and when tightened tend to close the slot 106 thus binding the shank 101 of each tooth in its set position. The side of the disk having the plain orifices is further radially slotted as at 104 between the shanks of the adjoining teeth whereby the screws 98 adjacent any one shank may be tightened to independently clamp that shank.

The cutting end or tooth proper of the several teeth 100 is ground in the customary manner that is in cross section substantially the shape of the tooth of a rack with which the gear to be cut would mesh, the cutter teeth however being ground slightly narrower on the face to permit of a slight lateral movement during cutting operations for the purpose of finishing the side faces of the gear teeth in proper relation to the cone or pitch center of the gear. The teeth are also ground to a curve along their length substantially that of the diameter of the cutter though in the present invention this may not always be the case as the cutter while rotating during operation meets the gear blank which is also rotating and the speed of the respective rotating elements must be considered and a curve of the tooth made in conformance with the line described by a given point on the cutter as it passes over the plain surface of the gear when coincidently rotated, and the teeth backed off or narrowed toward the drag end to give proper clearance.

Figure 17:
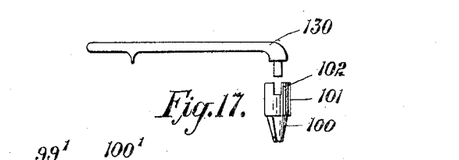
Fig. 17 is a detail view of a tooth of the cutter shown in Fig. 14 with the tool for adjusting the same.

The teeth of the cutter are further adjusted in the cutter disk by inserting a wrench 130 in the shank slot and turning the shank until the cutting edges of the teeth are directed along the proper tangential arcs to the cutter periphery and the teeth locked.

The teeth of the cutter will now follow the desired lines across the surfaces of the gear blank as particularly shown in Fig. 4 and furthermore each tooth of the cutter will take into the gear blank at a different point about its circumference that is into the space to be cut away to form another tooth, and this action will eliminate the necessity of indexing the gear the cutter indexing its own path about the gear blank, the number of teeth being regulated by the ratio of gearing which determines the respective speeds of the cutter and blank.

The generation of the teeth is also simplified as regards the necessary operation on the machine, the method of accomplishing the same being clearly shown in Figs. 5, 6, 7, and 8 wherein the established principle of evolution is used for generating the teeth with the difference that the continuous rotation of the blank during the operation of the cutter enables all the teeth to be generated coincidently and requires only the one roll of the gear blank past the cutting element and it will be understood that a blank may be first roughed out and afterward given finishing cuts though it is deemed possible with the present invention to cut the finished gear with one series of operations comprising rolling the blank to generate one side of each tooth to the base then slightly shifting the cutter to complete the dedendum and bring the sides of the cutter teeth properly in contact with the remaining side faces of the gear teeth to be generated, that is in proper relation to the cone pitch point and lastly rolling the gear on out of engagement with the cutter teeth whereby the gear teeth are completely generated.

It must be understood that for certain gears it may not be considered necessary to move the cutter across the dedendum when operating on the respective sides of the teeth as the rotation of the gear blank in the continuous manner described will cause the outer periphery of the gear face to travel faster and consequently farther than the inner periphery thus cutting away more metal and giving a taper to the teeth which may suffice in some instances for sufficiently close meshing of the gear with the pinion.

Figure 14:
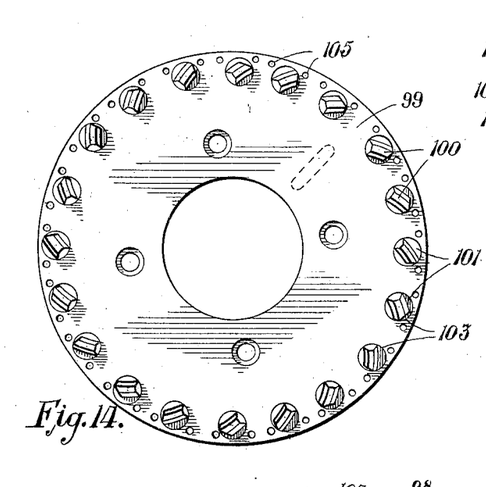
Fig. 14 is an enlarged plan view of the preferred form of cutter used in the present invention.
Figure 15:
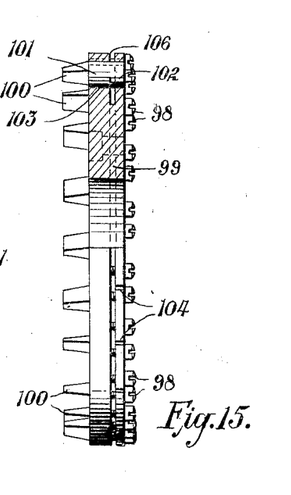
Fig. 15 is a side elevation partly in section of the cutter shown in Fig. 14.
Figure 16:
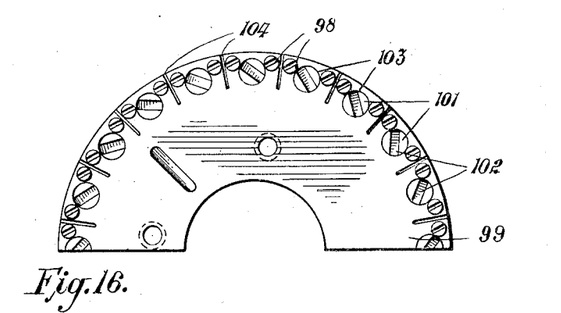
Fig. 16 is a plan view of one half the cutter shown in Fig. 14 from the reverse side.

The cutter as particularly shown in Fig. 14 has 20 teeth being curved to the arc of a circle whose diameter is that of the cutter. Ten of the cutter teeth are sharpened to cut on the outside and ten sharpened to cut on the inside, outside and inside cutting teeth being arranged in succession the cutting side of each tooth being ground to the pressure angle and the other side being given clearance and the blades may be turned about on their round shanks and set to the exact required position to make their respective cuts as above mentioned. The blades will thus require to follow into a tooth being cut in the order of an outside cutting blade and an inside cutting blade and this will always be the case providing the gear or pinion blank is laid out with odd number of teeth whereby the even number of teeth on the cutter will always leave one over the odd number on the blank thereby starting an outside cutting tooth where an inside cutting tooth has immediately previously traveled. In the drawings the gear shown in Fig. 1 has 45 teeth and the cutter shown in Fig. 14, 20 teeth though of course these can be altered providing an arrangement is carried out whereby the gear or pinion teeth are operated upon in the manner above described though of course if the refinements in cutting are not required then the arrangement of teeth in cutter and blank as mentioned will not be necessary.

Figure 18:
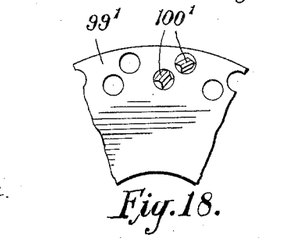
Fig. 18 is a fragmentary view of a cutter showing a modified arrangement of teeth.

It is also evident that the cutter may be arranged with teeth 100′ in tandem that is practically dividing each tooth as shown in Fig. 18 into two teeth one following the other in the same cut in the gear blank and being given clearance on opposite side faces, and such modifications will in no manner depart from the spirit of the invention.

The form and operation of the cutter as herein described will always bring a comparatively cool tooth of the cutter into contact with a cool tooth in the gear and will enable the speeding up of cutting operations whereas in an ordinary face-mill type of cutter the teeth are always at work on the one tooth of the blank and such continued contact heats up both sets of teeth.

In Figs. 19 to 24 inclusive a machine suitable for operating a cutter and gear blank in accordance with the invention is shown, and in the following description of the machine it must be understood that the several parts are referred to and are shown in the drawings as illustrative of the invention without many of the details which may be found necessary in commercial use such as the arrangement of the several bearings, shaftings, and gears for the general transmission of power to the various parts of the machine, the general arrangement of the frame and supporting parts, the means for oiling and the various means for adjustment must all be considered as optional to modification and change within the spirit and scope of mechanical skill and practice without departing from the scope of the claims.

In the drawings the machine is shown with a frame 10 substantially triangular in form having the raised section 11 and the bed section 12 the near corner of the bed section being cut away to permit of access to the work supported in the machine as hereinafter described. The section 11 has a table 13 of substantially triangular shape formed separate and tiltably supported along the base or front side by an arc shaped work block 14 at one end and a trunnion piece 15. The trunnion piece 15 rests in a bearing 16 in the section 11 and is held therein by a bearing cap 17 securely fastened to the section 11 as by the bolts 18, and is further firmly fastened to the table as by the bolts 19.

The trunnion further is bored out and fitted with a bushing 20 to form a bearing for the main drive shaft 21, said drive shaft thereby extending through the axial center of the machine and being further supported at its inner end by a bearing block 22 securely fastened to the table as by the bolts 23.

The drive shaft has a bevel gear 24 fixedly mounted thereon between the trunnion bearing 15 and the end bearing 22 for operating the gear blank as hereinafter fully described and a bevel gear 25 outside the trunnion bearing for operating the cutter as hereinafter fully described; a loose pulley 26 and a drive pulley 27 are also mounted on the outer end of the drive shaft.

An arc shaped work piece 14 is securely fastened to the table 13 as by the bolts 28 and forms the edge of the table nearest the work, being cut away in stepped circles 29 and 30 to accommodate a gear or pinion blank as hereinafter fully described. The piece 14 further has a circularly formed track 31 concentric with the axial center of the machine and extending from the upper side of the piece around the front of the machine to the under side of said piece thereby forming almost a complete circle of track the same being seated in a correspondingly shaped bracket 32 securely fastened to the frame of the machine as by the bolts 33 and enveloping said track for more than one-half the periphery thereof and being made with a cover plate 34 forming one-half of the track groove and firmly secured to the bracket as by the bolts 35 whereby a rocker support is completed for the arc shaped work piece 14 having the table secured thereto. It will be thus seen that the table is free to tilt about the axial center of the machine by the arrangement of the trunnion and track supports as above described.

The work piece 14 is transversely slotted at 36 throughout substantially its entire length and is further provided with vertically extending arc shaped slots 37 whereby a work block 38 may be fitted in said slot 30 and adjusted therein and fastened as by the bolts 39 extending through said block and the arch shaped slots 37.

The block 38 has a bearing orifice therethrough and supports a work spindle 40 shown in full lines in the drawings as in a position to support the gear blank 200 suitably secured on the outer end thereof as by the nut 42. The inner end of the work spindle where it extends beyond the inner end of the work block has a bevel gear 43 fixedly mounted thereon.

The bevel gear 43 of the work spindle may be operatively connected to the bevel gear 24 on the drive shaft through the medium of any suitable train of gears though the particular arrangement shown in the drawings will provide for the universal adjustment of the work spindle and block to support either a gear or pinion blank, and will also permit the changing of speed and direction of rotation of the blank according to the direction of curved tooth desired all as hereinafter fully described.

Figure 19:
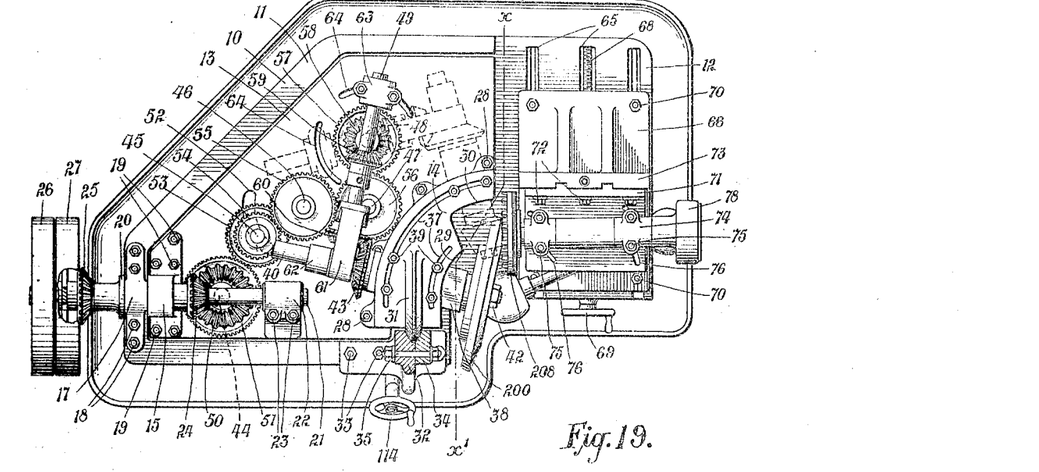
Fig. 19 is a plan view partly in section of a machine embodying the invention.
Figure 20:
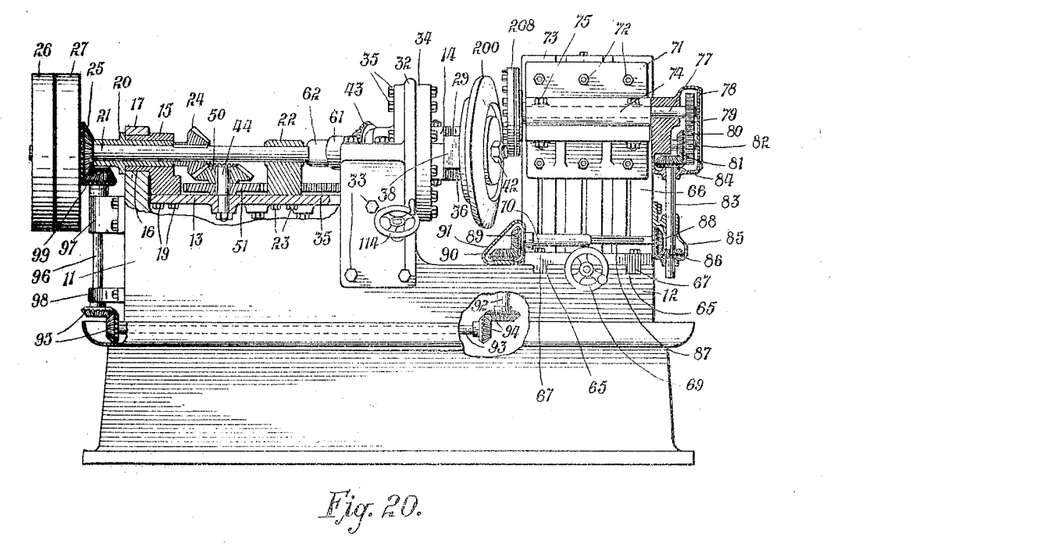
Fig. 20 is a front elevation view of the machine partly broken away and showing the parts about the drive shaft in section.
Figures 21, 22, 24:
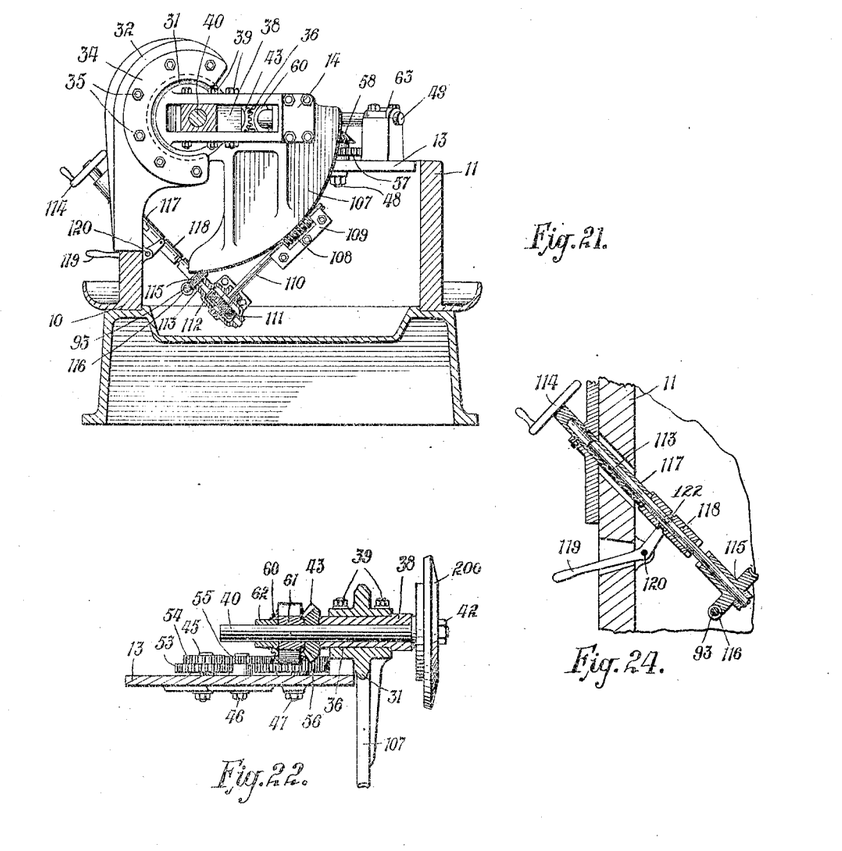
Fig. 21 is a cross sectional view of the machine on the line $x$—$x'$ Fig. 19.
Fig. 22 is a sectional elevation view of the tiltable table and work spindle mounted thereon.
Fig. 24 is a sectional detail view of a part of the front frame showing the means for operating the tiltable table.
Figure 23:
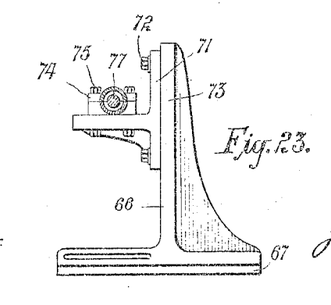
Fig. 23 is a side elevation of the cutter chair with adjustable bracket and the cutter shaft housing mounted thereon and in section.

A train of gears for performing the work above referred to is particularly shown in Fig. 19, being arranged on the table 13 and mounted on a series of stud shafts 44, 45, 46, 47, 48 and a reach shaft 49. The shaft 44 has a bevel gear 50 mounted thereon and meshing with the bevel gear 24 and operatively rotating with the spur gear 51 also mounted on the shaft 44. The shaft 45 is adjustable in an arc shaped slot 52 in the table 13 and has mounted thereon a spur gear 53 meshing with the gear 51 and the change speed spur gear 54 turning with the gear 53. The shaft 46 has a spur gear 55 mounted thereon and meshing with the change speed gear 54. The shaft 47 has an idler spur gear 56 mounted thereon and meshing with the gear 55.

The shaft 48 has a spur gear 57 mounted thereon and meshing with the gear 56 and a bevel gear 58 meshing with a bevel gear 59 fixedly secured on the reach shaft 49, said reach shaft also having the bevel gear 60 fixedly mounted thereon and meshing with the bevel gear 43 on the work spindle.

The reach shaft 49 is supported at its inner end by the forked bearing 61 which extends about the gear 60 and envelops the work spindle 40 immediately next the bevel gear 43, being retained in place by the collar 62 whereby the gear 43, bearing 61, and collar 62 may be adjusted along the outer end of the work spindle 40. The reach shaft 49 at its outer end is supported in a bearing block 63 adjustable in arc shaped slots 64 concentrically arranged about the stud shaft 48 whereby the gears 58 and 59 may always be moved into proper meshing position to accommodate the adjustment of the gear 43 on the work spindle. This adjustment is necessary to provide for the cutting of gear blanks and pinions having different pitch angles. In the drawings and particularly in Fig. 19 in full lines is shown a gear blank having a pitch angle of approximately 76° and from the above description it will readily be understood that the work block 38 may be adjusted to properly position a gear blank of different pitch angle such adjustment of the work block moving the work spindle with it and of necessity requiring adjustment of the gears 43, 60, and 59 with the reach shaft 49 as it is necessary for the transmission of power that the work spindle and the reach shaft be at right angles one to the other and the same with reference to the reach shaft 49 and the stud shaft 48.

It will also be understood that the direction of rotation of the gear blank may be reversed by adjusting the arrangement of the gearing as by reversing the position of gear 59 on the reach shaft, so that said gear meshes with the gear 58 on the opposite side of the stud shaft 48, that is adjacent the bearing block 63.

This same adjustment of both position and rotation of the work spindle may be extended to provide for the cutting of a gear pinion as shown in dotted lines and further the speed of rotation of either the gear blank or pinion may be adjusted by the changing of any of the gears to secure a different ratio or by replacing the change speed gear 54 with one of different diameter.

It will be thus understood that the gear blank 41 may be constantly rotated in either direction or at any desired speed to coöperate with the cutter when positioned as hereinafter described.

The bed section 12 of the machine is formed with suitable guide slots 65 and has a chair 66, adjustably arranged thereon with guide flanges 67 fitting the slots 65 and movable to any position therein by any suitable means such as the well known form of threaded spindle 68 operative by the hand wheel 69, suitable clamping bolts 70 being provided to clamp the chair to the bed of the machine.

A bracket piece 71 is adjustably bolted as by bolts 72 to a vertically extending portion 73 of said chair and a bearing box 74 is supported on said bracket and adjustably secured thereon as by bolts 75 extending through said bearing box and arc shaped slots 76 in said bracket said slots being concentric with the mathematical center of the machine, that is the imaginary point as formed by the apex of the cone frustum formed by the gear or pinion blank as positioned in the machine.

A cutter shaft 77 is journaled in the bearing box 74 having the cutter 208 securely mounted on the inner end thereof, the outer end of said cutter shaft being operatively connected to the drive shaft by any suitable train of gears and shafting and the form shown in the drawings must be considered as illustrative.

In the drawings the bearing box 74 has a gear housing 78 formed on the outer end thereof and housing the change speed gears 79 and 80, the gear 79 being fixedly mounted on the outer end of the cutter shaft 77 and gear 80 being rotatably mounted with the bevel gear 81 on a stud shaft 82 in said housing. A vertical shaft 83, having a bevel gear 84 fixedly mounted on the upper end thereof and engaging with the gear 81, extends downwardly from the housing 78 to a gear housing 85 adjustably secured to the chair 73 and has a gear 86 splined thereon to permit vertical movement of the shaft 83 with any vertical adjustment of the bracket 71 on the chair 73. Similarly the housing 85 when adjusted on the chair will accommodate the swing of the outer end of the cutter shaft housing whereby the cutter 208 is positioned to the base angle of the gear as well understood in the art. Adjustment of the housing 85 as also any further movement of the same with the chair 73 upon the bed of the machine is further accommodated by the telescopic shaft 87 having a gear 88 meshing with the gear 86 and a gear 89 meshing with a gear 90 contained in a housing 91 pivotally arranged in the center of the machine and having a vertical shaft 92 extending downwardly therefrom and operatively connected with a shaft 93 by a pair of bevel gears 94. The shaft 93 is supported in suitable bearings toward the base of the machine and extends to the end immediately beneath the drive shaft where it is operatively connected as by a pair of bevel gears 95 with a vertical shaft 96, said shaft 96 being supported in bearings 97 and 98 and having a gear 99 mounted on the upper end thereof and meshing with the gear 25 on the drive shaft of the machine.

In this manner connection is made between the drive shaft of the machine and the cutter shaft which will permit the cutter to be raised or lowered or moved along as required by any adjustments which may be made in the position of chair 66, the bracket 71 and the cutter shaft housing 74 to properly position the cutter 208 as mounted on the inner end of cutter shaft.

The table 13 of the machine has been described as tiltably supported on the bearings 20 and 34 and this is for the purpose of generating the gear or pinion blank and coincidently the feed of cut, the table for this purpose having the worm gear quadrant 107 concentric with the bearings 20 and 34 and all concentric with the axial line of the machine passing through the pitch cone point of the gear blank. A worm 108 is suitably supported in a bearing 109 and meshes with the teeth of the worm quadrant 107, the shaft 110 of said worm having a worm wheel 111 fixedly mounted at the lower end thereof and operatively engaged by a worm 112 having the shaft 113 thereof extending at right angles to the shaft 110 and upwardly through the front of the machine and having a hand wheel 114 rotatably mounted thereon and a worm wheel 115 rotatably mounted thereon toward the lower end thereof and operatively engaging with a worm 116 on the shaft 93. The hub of the worm wheel 115 as also the inner end of the elongated hub 117 of the hand wheel are notched to coöperate with a well known form of notched clutch member 118 suitably splined to the shaft 113 and slidable thereon into engagement with either the hub of the hand wheel or the worm wheel, said clutch member being moved to either position desired by a hand lever 119 pivoted as on a pin 120 in the front frame of the machine and having the inner end engaging with a circumferential slot 122 in the clutch member 118 whereby the hand lever may be raised to operatively connect the shaft 113 with the worm wheel 115 and, through the connection as above described, tilt the table 13 as the shaft 93 is rotated with the continued operation of the machine, to automatically generate and cut the gear blank, or said hand lever 119 may be lowered to operatively connect the shaft 113 with the hand wheel 114 whereby the operator may tilt the table to any desired position for the purpose of aiding in the feed of cut and generation of the gear teeth, or to position the gear work spindle for the convenient removal of the finished gear in readiness for cutting another.

It has been already mentioned that the drawings are purposely made with a view to illustration and accordingly mechanical features commonly used such as forced feed lubrication, graduated dials and indicators, mechanical adjustments of bearing and gearing casings have been omitted as also automatic attachments which might be applied for stopping and starting the machine at predetermined intervals, as such are not necessary to accomplish the object of the invention but may be applied purely as a matter of refinement and convenience.

It will be understood from the foregoing that the gear or pinion blank to be cut, is set on the machine when the table is level, and adjusted to the required pitch angle, and the work piece may be graduated for this purpose. The table is now tilted to its lower position and the cutter adjusted to reach the required base angle, and the bracket supporting the cutter shaft and housing may be graduated for this purpose.

The machine is now in readiness to start cutting operations on the gear or pinion blank and the power feed is connected by moving the hand lever as described and the table is gradually moved up with the gear or pinion blank constantly rotating in relation to the constantly rotating cutter and such upward movement of the table will roll the gear or pinion blank past the cutter to gradually cut and generate all the teeth of the gear.

The cutter bearing bracket and chair may also be adjusted and the gearing changed all as described and well understood in the art to give proper direction and extent of curve to the teeth of the gear or pinion.

Having thus described the invention what is claimed and desired to be secured by the Letters Patent is:

1. A gear cutting machine comprising means for rotatably supporting a cutting element, a drive shaft, a work spindle, having its axis angularly adjustable relative to said drive shaft and revoluble thereabout past the operative path of said cutting element and means for connecting said cutter element and said spindle to said drive shaft for continuous rotation thereby.

2. A gear cutting machine comprising means for rotatably supporting a cutting element, a drive shaft, a work spindle, having its axis angularly adjustable in relation to said drive shaft and the axis of said cutting element and revoluble about said drive shaft past the operative path of said cutting element and means for continuously rotating said cutter element and said spindle during the cutting operation.

3. A gear cutting machine comprising means for rotatably supporting a cutter element operative in a plane tangent to the cone of the gear to be cut, a table tiltable about an axis for rolling the gear on its pitch cone, a work spindle rotatably supported on said table and means for continuously and operatively rotating said cutter element and said work spindle during the cutting of the complete gear.

4. A gear cutting machine comprising means for rotatably supporting a cutter element operative in a plane tangent to the cone of the gear to be cut, a table tiltable about an axis for rolling the gear on its pitch cone, a work spindle rotatably supported on said table, a drive shaft mounted on said table and concentric with the axis about which said table tilts and means for continuously and operatively rotating said cutter element and said work spindle from said drive shaft during the cutting of the complete gear.

5. A gear cutting machine comprising a frame having a cutter element rotatably supported therein and adjustable about the apex of the pitch cone of a bevel gear blank on said frame, a table supported in said frame and tiltable about an axis passing through said apex, a work spindle rotatably mounted on said table and angularly adjustable in relation to the axis of said table, a shaft rotatably supported in said frame concentric with the axis about which said table tilts, a train of gears adjustably mounted on said table and operatively connecting said shaft and said work spindle and means operatively connecting said shaft with said cutter element.

6. A gear cutting machine comprising a frame having a cutter member rotatably supported therein and adjustable about the apex of the pitch cone of a bevel gear blank on said frame, a table supported in said frame and tiltable about an axis passing through said apex, a work spindle rotatably mounted on said table and angularly adjustable in relation to the axis of said table, an axial shaft rotatably supported in said frame concentric with the axis about which said table tilts, a stud shaft positioned on said table, a train of gears operatively extending from said axial shaft to said stud shaft, a reach shaft adjustable about said stud shaft and operatively extending therefrom to said work spindle and means operatively connecting said axial shaft and said cutter member.

7. A gear cutting machine comprising a frame, a toothed cutter element rotatably supported therein and adjustable about the apex of the pitch cone of a bevel gear blank on the machine to determine the base angle of the teeth of a given gear to be cut and a work spindle adjustable about said apex to determine the pitch angle of said gear and rotatable with said cutter element at speeds in ratio to the number of teeth in said cutter element and to be cut in said gear.

8. A gear cutting machine comprising a frame, a toothed cutter element rotatably supported therein and adjustable about the apex of the pitch cone of a bevel gear blank on the machine to determine the base angle of the teeth of a given gear to be cut, a work spindle adjustable about said apex to determine the pitch angle of said gear and rotatable with said cutter element at speeds in ratio to the number of teeth in said cutter element and to be cut in said gear and means for moving said work spindle about said apex and past the relative operative position of said cutter element.

9. A gear cutting machine comprising a frame, a toothed cutter element supported therein and adjustable about the apex of the pitch cone of a bevel gear blank on the machine, a table tiltable about an axis passing through said apex, a work piece secured to said table next said apex, and formed in stepped arcs and transversely slotted, a work block adjustable in the slot in said work piece, a work spindle journaled in said work block and means for operatively rotating said spindle and said cutter element at speeds in ratio to the number of teeth in said cutter element.

Signed at the city of Detroit, county of Wayne, State of Michigan, this 9th day of October, 1916.

J. E. LLOYD BLACKMORE.

Witness:
C. H. BLACKMORE.